Dec. 12, 1933.  A. BESTELMEYER  1,939,161
APPARATUS FOR OPTICAL TRANSFER OF MEASUREMENTS
Filed July 16, 1931  4 Sheets-Sheet 1
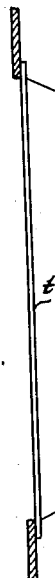
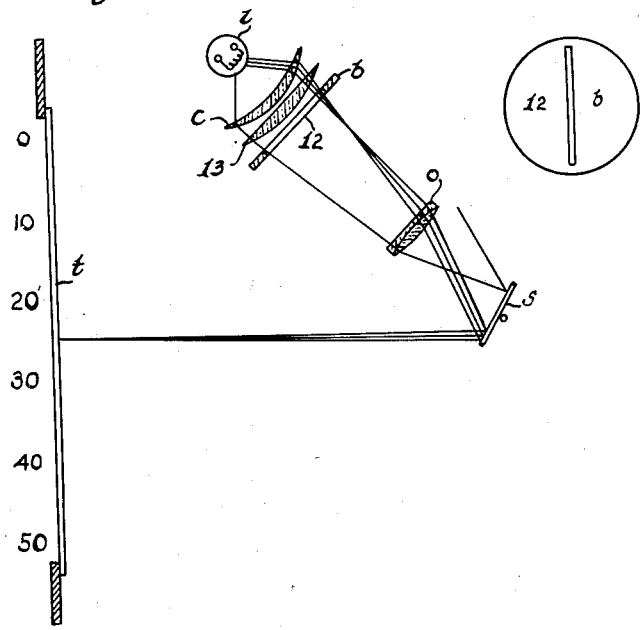
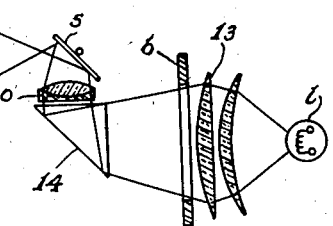
INVENTOR
Adolf Bestelmeyer
BY
Harold D. Penney  ATTORNEY Dec. 12, 1933.        A. BESTELMEYER         1,939,161
APPARATUS FOR OPTICAL TRANSFER OF MEASUREMENTS
Filed July 16, 1931        4 Sheets-Sheet 2
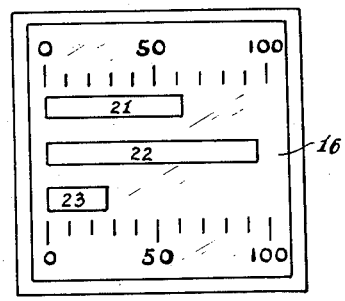
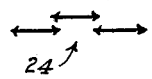
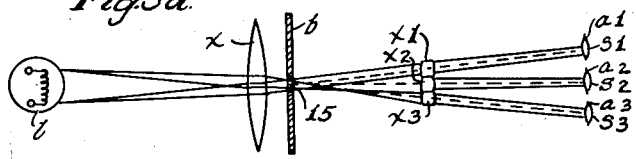
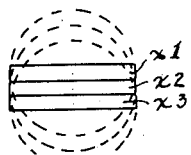
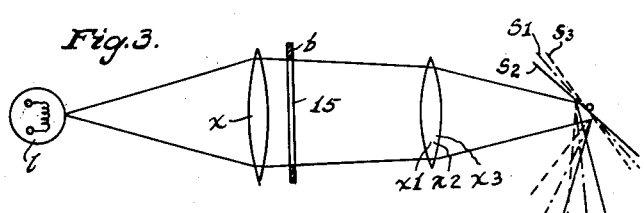
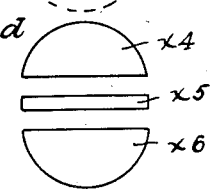
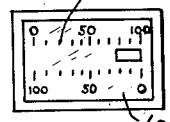
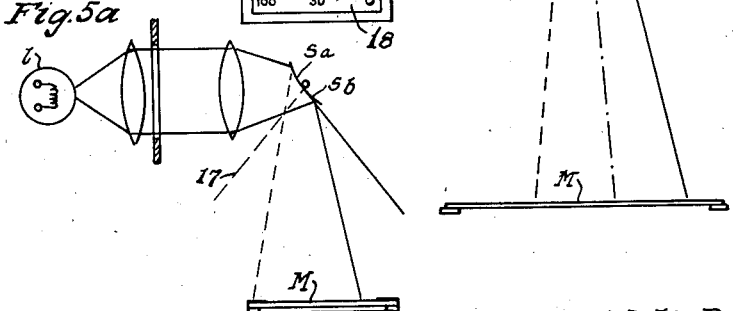
INVENTOR
Adolf Bestelmeyer
BY
Harold D. Penner    ATTORNEY Dec. 12, 1933.  A. BESTELMEYER  1,939,161
APPARATUS FOR OPTICAL TRANSFER OF MEASUREMENTS
Filed July 16, 1931   4 Sheets-Sheet 3
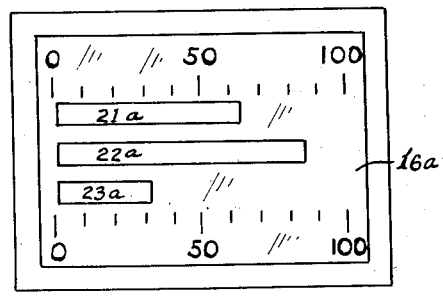
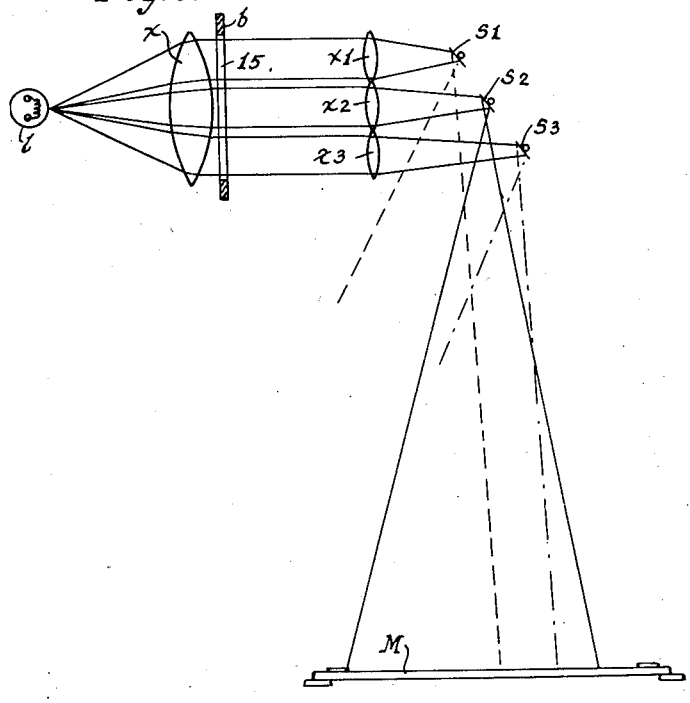
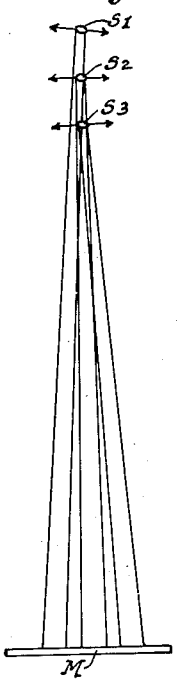
INVENTOR
Adolf Bestelmeyer
BY
Harold D. Penney, ATTORNEY Dec. 12, 1933.  A. BESTELMEYER  1,939,161
APPARATUS FOR OPTICAL TRANSFER OF MEASUREMENTS
Filed July 16, 1931  4 Sheets-Sheet 4
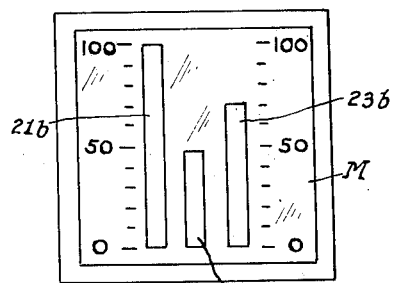
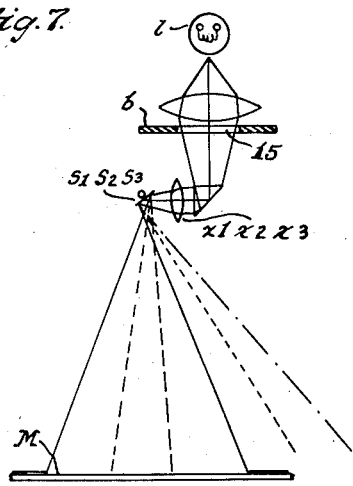
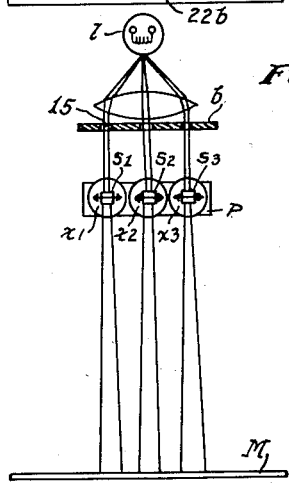
INVENTOR
Adolf Bestelmeyer
BY
Harold D. Penney  ATTORNEY Patented Dec. 12, 1933

1,939,161

UNITED STATES PATENT OFFICE 1,939,161

APPARATUS FOR OPTICAL TRANSFER OF MEASUREMENTS

Adolf Bestelmeyer, Frankfort-on-the-Main, Germany, assignor to Hartmann & Braun Aktiengesellschaft, Frankfort-on-the-Main, Germany, a corporation of Germany Application July 16, 1931, Serial No. 551,161, and in Germany July 24, 1930

6 Claims. (Cl. 88—24)

This invention relates to optical transmission of measured or metered qualities and has for an important object the provision of an organization in which the constituent elements are so coordinated structurally and functionally as to assure improved results with inexpensive material which is easy to maintain in efficient working condition.

Heretofore electrical instruments have been provided with optical means for using a light-spot, there being mainly two forms of construction for this purpose, to wit: either a light-spot is caused to travel over a dial or scale and to indicate the value of the measuring quantity; or else a luminous band, similar as the mercury column of a thermometer, is caused to be shifted from the beginning or origin of the scale as far as the value of the measured quantity indicated at the time. In either case arrangements could also be made so that the entire scale or dial is illuminated and that a line or band in the form of a shadow indicates, or allows of the reading of, the measured quantity.

While in the arrangement predicated for its operation and use upon a shifting light-spot, or a shadow mark, recourse is mostly had to the known method comprising a rotary mirror. In the case of instruments involving a luminous band shifting in longitudinal direction such arrangements have always been made that in the path of the light-pencil or beam illuminating the dial, there has mostly been interposed a mobile body producing a shadow.

This latter arrangement, however, involves the drawback that the shadow-throwing or casting body of necessity must be mounted at a relatively great distance from the axis of rotation of the measuring mechanism so that, no matter how light in weight and construction it may be, it exhibits a considerable sluggishness or inertia.

Another object of this invention is the provision of an arrangement according to which the pivotal mirror employed for the production of the luminous band may be disposed close to the mathematical axis of rotation of the measuring mechanism, so that it will involve only a small amount of inertia. By this arrangement, as opposite and distinct from the shadow indication or mark due to a mobile shadow casting body, the luminous indicator of this invention is advantageous, in that, for instance, a luminous diagram results in a considerably more conspicuous spot.

Another object of this invention is the provision of means for causing the image or band to become shorter or longer, in accordance with the metered value produced. In an arrangement comprising a mobile element, as in a galvanometer, there is not merely formed a spot of light, to serve as an indicator, or a shadow line, but by choosing a suitable dimension for the luminous source there is obtained a luminous line or stripe of such size that, in the presence of an end deflection or complete throw, it will fill up the whole length of a scale, whereas in the presence of a smaller reading or measured quantity and in accordance with a correspondingly different position of the mirror, the image of the end of the luminous source is thrown towards a point within the scale, so that merely by such rotation of the interposed mirror the luminous band indicating the end value upon the scale appears longer or shorter.

With the above indicated objects in view, and others which will hereinafter appear, the invention is exemplified in novel constructions, which, including certain combinations and arrangements of parts, are herein clearly described, and fully illustrated in the accompanying diagrammatic drawings, in which:

Figs. 1 and 1a illustrate one embodiment of the invention;

Fig. 2 shows a modification of the structure illustrated in Figs. 1 and 1a;

Figs. 3, 3a, 3b, 3c and 3d illustrate another embodiment;

Fig. 4 is a representation of mirror axes;

Figs. 5 and 5a illustrate an embodiment of the invention for indicating travel of oppositely movable quantities;

Figs. 6, 6a and 6b show another modified form of structure for accomplishing the stated results; and Figs. 7, 7a and 7b illustrate a further modification.

In the embodiment of the invention illustrated in Fig. 1, the light issuing from an incandescent electric lamp 1 is focussed by a condensing lens $c$ in the neighborhood of an objective or compound lens $o$ and rotary mirror $s$. In front of the said condensing lens $c$ is mounted a diaphragm, disc or stop $b$, which is adapted to cut out of the light passing through the condensing lens a long and narrow stripe or line, as at 12, the direction of said line being at right angles to the axis of rotation of the mirror $s$ or reflector. Fig. 1a shows a front elevation of the diaphragm. The objective produces beyond the mirror $s$ an enlarged image on the transparent graduated scale $t$, or receiver. Another lens is shown at 13 in the present case.

Because of considerations of space it is often necessary in practice to interpose additional reflector surfaces, in such a way as shown in Fig. 2, where a prism 14 is introduced. It is thus feasible to mount the lamp 1 upon the opposite end rather than the scale end or side.

The same arrangement in combination with certain modifications may be used for the purpose of causing the appearance not merely of one, but rather of several such light-spots or marks or luminous lines adjacent to one another upon the groundglass pane or plate, each thereof corresponding to several metered quantities. These novel means consequently insure a fundamentally known comprehensive assembly or summary picture, as it were, whereby a plurality of readings or metered values can be represented in a very clear manner and be readily compared with one another.

One embodiment of this idea is shown by way of example in Figs. 3 and 3a–3d. In this example the rays issuing from a light-source $l$ are concentrated by a condensing lens $x$ in front of which is positioned a diaphragm $b$ having a narrow elongated slit 15. Looked at from the right-hand side the said slit acts like a luminous line. The light coming from the said luminous line is collected by three lenses $x1$, $x2$, and $x3$ and is thence focussed upon the three mirrors $s1$, $s2$, $s3$. In order to make it possible to mount these mirrors at close proximity to one another these lenses may consist of narrow sectors of three circular lenses, which are juxtaposed, as shown in Figs. 3a and 3c. However, instead of these sectors, three parts, $x4$, $x5$, $x6$, of a single circular lens may be employed, as shown in Fig. 3d where they are somewhat spaced apart.

The three mirrors $s1$, $s2$, $s3$ are revolvable by any agency such as that of measuring mechanisms or meter works. The axes of the three mirrors or the planes laid therethrough may present a slight inclination in reference to one another in order that the images 21, 22, 23, which they produce of the luminous line may be caused to appear upon the graduated scale or dial 16 at a slightly smaller or greater distance.

Another auxiliary means adapted to arrange the three mirrors, and thus the three luminous lines, upon a groundglass plate, as closely together as possible, consists in arranging the mirror axes 24, as indicated in Fig. 4, in staggered relation to one another. In this instance the mirror axes may be of greater length and may be supported more dependably, the particular axes being evolved by the meter mechanisms in any suitable way.

In order that it may be possible to indicate with one and the same measuring instrument whether the metered quantity, say, power, in a given line, is flowing in the one or in the opposite direction which is very important in the case of power stations, as when interconnected, two mirrors $sa$ and $sb$ as shown in Fig. 5a may be arranged upon a joint and common shaft 17, as of a wattmeter, though presenting a certain angle in reference to each other. The said mirrors are so positioned that in the presence of zero power, neither of the same will cause light to be thrown upon the groundglass plate M. But if the pair of mirrors is shifted somewhat in right-hand or clockwise direction about its median position, then a luminous line will appear from the right-hand side the length of which must be read on the lower scale 18. But if the pair of mirrors is turned by the mechanism in the opposite sense, then a luminous picture will appear from the left-hand side the reading of which is taken on the top scale 19. In the former case the image is produced by the lower mirror $sb$ and in the second case from the upper mirror $sa$.

Under certain circumstances it may also be of advantage to throw two parallel luminous lines upon the groundglass plate, that is, one from the right hand side and the other one from the left hand side.

Figs. 6, 6a and 6b illustrate another embodiment of the basic idea of the invention. In this arrangement a narrow slit in a diaphragm $b$ is illuminated from a source of light $l$ by way of a condensating lens. Contradistinct to the arrangement shown in Figs. 3 and 3a 3d, it is not the image of the entire illuminated slit of the diaphragm, but merely one-third of the length thereof, that is here collected by each of a condensing lens $x1$, $x2$, and $x3$ and thrown respectively upon mirrors $s1$, $s2$, $s3$. This offers the advantage that the three lenses may be positioned exactly in front of the median line of the slit, through the operation of the mechanism is predicated upon an adequate length of the slit or aperture 15 in the diaphragm $b$.

The axes of rotation of the mirrors, as indicated in Fig. 6a, are slightly inclined in reference to one another so that the images of the three parts of the illuminated slit will come to appear adjacent to one another upon the ground glass plate, as can be seen from the projection in Fig. 6, 6a, and the front view of the dial 16a in Fig. 6b, which shows images 21a, 22a and 23a.

The mirrors $s1$, $s2$, $s3$ furthermore are at somewhat different distances from the lenses $x1$, $x2$, $x3$ in order that the lower mirrors may not impede the light rays of the upper one. In accordance with such differences in distance, the curvatures of the lenses $x1$, $x2$, $x3$, as indicated by the lenses of different thickness shown in Fig. 6, may be correspondingly chosen. The rays are allowed to impinge upon the groundglass plate in a way as hereinbefore described.

While in the arrangements hereinbefore disclosed, a single slit is provided, the image of which is thrown by the lenses upon different mirrors, a plurality of such slits 15 is provided in the further embodiment as shown in Fig. 7, 7a, 7b, where three such slits are indicated. These slits are parallel to one another in the diaphragm $b$ and they appear, when viewed in Fig. 7a from below, as three parallel luminous lines, 21b, 22b, 23b. The images of these lines are thrown through an elongated prism $p$, or prismatic lens, and again through three condensing lenses $x1$, $x2$, $x3$, upon the mirrors $s1$, $s2$, $s3$ of the three measuring instruments, whence they are transmitted to the groundglass plate in the same way as hereinbefore described in detail. Provided the distances of the three slits in the diaphragm $b$ are sufficiently great, the mirror axes in this arrangement may lie in the same line, and the mirrors may be disposed in perfect regularity. However, there is no objection to slightly shifting the mirror axes in relation to one another, in order that the luminous lines upon the groundglass plate may be sufficiently spaced apart from one another.

While reference has been made throughout the above specification to lenses only, in a general way, this should not be construed to mean that in all cases simple lenses are concerned, for it will be understood that, in a way well known in the prior art, suitable lens assemblies or groups could be employed in lieu of the simple lenses, as is customarily done in the optic arts.

For instance, if it were desirable in the case of an arrangement as shown in Fig. 3 to have the longitudinal direction of the slit in the diaphragm and the longitudinal direction of the luminous lines upon the groundglass plate not in the same or in parallel planes, then a picture erection device may be interposed in the trajectory of the rays. Where such a device is provided, the luminous lines or marks, as in Fig. 3b, would extend from below upwardly, rather than from left to right.

As the hereinbefore described construction admits of considerable further modification, without departing from the invention, the particular arrangements shown should be taken as illustrative, and not in a limiting sense. Therefore, the scope of the protection contemplated is to be taken solely from the appended claims, interpreted as broadly as is consistent with the prior art.

I therefore claim:

1. Energy transmitting mechanism including in combination a condenser for transmitting a beam of light, spaced lenses, spaced cooperating rotatable reflectors, a disc having slots therein and positioned between said condenser and said lenses to project lines of light on said reflectors, there being one slot for each reflector, and means for receiving the reflected lines of light.

2. Mechanism according to claim 1, in which said mirrors are disposed in staggered relation, substantially as and for the purpose described.

3. Mechanism according to claim 1, in which a prism is disposed between said discs and said spaced lenses, substantially as and for the purpose described.

4. Energy transmitting mechanism comprising in combination with a light source, a condenser for transmitting a beam of light, transversely aligned spaced lenses, transversely arranged spaced rotatable mirrors, a disc having slots therein and positioned between said condenser and said lenses to project lines of the condensed light on said respective mirrors, an elongated prism disposed transversely between said spaced lenses and said disc, and means for receiving the lines of light, substantially as and for the purpose described.

5. In combination with a light source, and a condenser therefor, a diaphragm having slots to permit passage therethrough of flat beams ot the condensed light, a rotary reflector for each slot, means for rotating said reflectors, an interposed prism for directing said beams to said reflectors, which latter are disposed at an angle to said diaphragm, and means for receiving said beams separately from the reflectors.

6. An apparatus of the class described comprising in combination with a light source, and a condenser therefor, a diaphragm having slots to permit passage therethrough of flat beams of the condensed light, cooperating transversely arranged rotary reflector for said slots, a shaft for rotating said reflectors, an interposed prism for directing said beams to said reflectors which latter are disposed at an angle to said diaphragm, and a graduated ground glass for receiving said beams separately from the reflectors.

ADOLF BESTELMEYER.